E. H. FREEMAN.
COVER FOR ELECTRICAL OUTLET BOXES.
APPLICATION FILED JUNE 24, 1910.
971,002.
Patented Sept. 20, 1910.
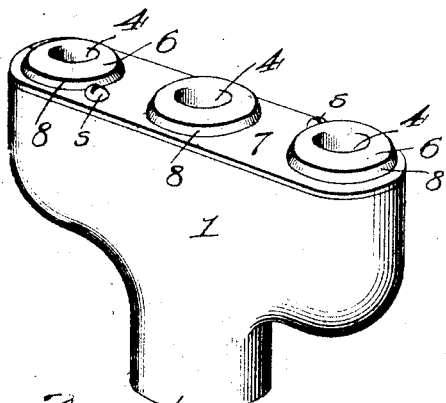
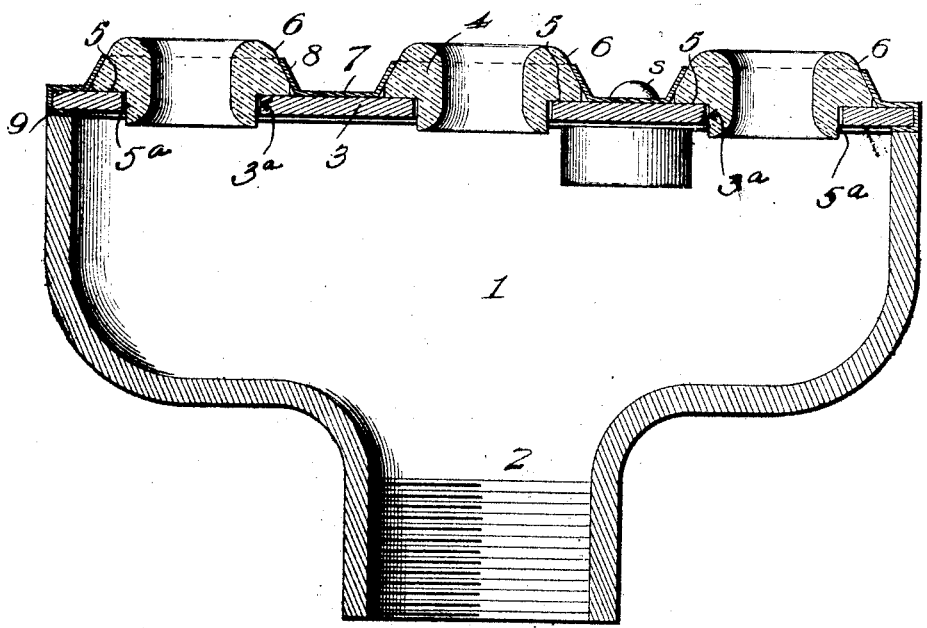
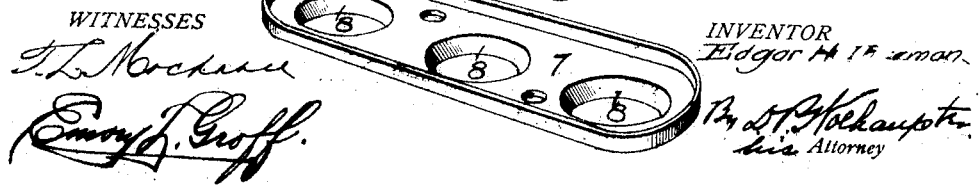
WITNESSES
INVENTOR
Edgar H. Freeman
By his Attorney

UNITED STATES PATENT OFFICE.

EDGAR H. FREEMAN, OF TRENTON, NEW JERSEY, ASSIGNOR TO E. H. FREEMAN ELECTRIC COMPANY, OF TRENTON, NEW JERSEY, A CORPORATION OF NEW JERSEY.

COVER FOR ELECTRICAL OUTLET-BOXES.

971,002.  Specification of Letters Patent.  Patented Sept. 20, 1910.

Application filed June 24, 1910. Serial No. 568,739.

*To all whom it may concern:*

Be it known that I, EDGAR H. FREEMAN, a citizen of the United States, residing at Trenton, in the county of Mercer and State of New Jersey, have invented certain new and useful Improvements in Covers for Electrical Outlet-Boxes, of which the following is a specification.

This invention relates to that class of fittings employed in connection with electrical wiring which are variously termed outlet boxes, junction boxes, convertlets, and more recently known in the trade as condulets, and which comprise means for facilitating the branching of electrical wires in distributing the same for lighting and other purposes.

To this end the present invention particularly has in view an improvement in the covers for outlet boxes of the character referred to, whereby the cover shall be thoroughly reinforced so as to possess exceptional strength and durability, while at the same time being so combined with novel fastening means for the insulating bushings for the branch wires as to admit of an all metal construction for the cover, instead of necessitating the making thereof from insulating material as is now the case with some forms of outlet boxes. Furthermore, in this connection, the invention contemplates a simple and very efficient fastening means for the insulating bushings which securely and firmly holds each individual bushing in such a manner that the same cannot fall out of position even if badly cracked or broken.

With these and other objects in view which will be apparent to those skilled in the art, without further description, the invention consists in the novel construction, combination, and arrangement of parts hereinafter more fully pointed out, illustrated, and claimed.

The preferred embodiment of the invention is shown in the accompanying drawings, in which—

Figure 1 is a perspective view of an outlet box having a cover fitted with the improvements contemplated by the present invention. Fig. 2 is an enlarged longitudinal sectional view of the same. Fig. 3 is an inverted detail perspective view of the fastening cap plate which fits over and reinforces the cover plate and comprises means for fastening in place the individual insulating bushings.

Like references designate corresponding parts in the several figures of the drawings.

In the embodiment shown in the drawings, the invention is illustrated as being applied to the well known condulet type of outlet box which essentially consists of a hollow, oblong box body 1, one side of which is open for the branching and distributing of the wires, while the opposite side of which is of closed formation and is provided with a centrally located inlet neck 2 through which the cable or plurality of wires enter the box, and which neck is coupled to the pipe or other conduit carrying the same.

According to the present invention, the open side of the box body is designed to be covered and inclosed by a metallic cover plate 3 of an oblong shape corresponding to that of the box body 1 and detachably secured to the latter through the medium of the fastening screws *s* or equivalent devices. To provide for the branching and distributing of the wires which are brought into the body 1 through the neck 2, the said metallic or equivalent cover plate 3 is provided therein with a plurality of outlet holes $3^a$, each of which outlet holes has fitted therein a porcelain or equivalent insulating bushing 4. Each insulating bushing 4 is provided with a smooth rounding hole therethrough for the passage of the wire, and is preferably formed with an intermediate rest shoulder 5 having an abutment or seat directly upon the outer face of the cover plate 3, said shoulder 5 producing on the body of the bushing an inner integral neck portion $5^a$ registering within the outlet hole in the cover plate. Another feature in the construction of the individual insulating bushing is that of forming the same with the externally tapered outer head portions 6 having a coöperating engagement with holding members of a fastening cap plate 7. The fastening cap plate 7 consists of a sheet metal plate of the same form as the cover plate and commensurate in dimension therewith so as to form a cap or facing which entirely covers and faces the outer side of the cover plate, and in order to permanently and intimately secure the two plates together, the said metallic cap plate 7 is preferably formed about its edge or perimeter with a marginal securing flange 9 which is bent about and beneath the marginal edge of the cover plate 3 as plainly shown in Fig. 3 of the drawings. A distinctive feature of the cap plate 7 is that of punching out and forming therefrom a plurality of offstanding inclined annular holding flanges 8, which are in fact individual tapering rings which snugly register with and clamp upon the tapered head portion 6 of the bushings 4. There is one of the holding flanges or rings 8 for each of the insulating bushings so that when the cover parts are all secured together, as shown in Fig. 2, the cap plate 7 not only reinforces and strengthens the cover plate against breakage, but also the holding flanges or rings 8 tightly clamp, in wedging engagement, upon the bushing head 6 and thereby hold the bushings rigidly in place. By reason of this construction, it will also be observed that on account of the character of the engagement between the flanges 8 and the bushings, and the fact that said flanges are in ring form, the bushings will be held in position even if badly cracked or broken.

From the foregoing it is thought that the construction and advantages of the herein described improvements will be readily apparent without further description.

I claim:

1. An outlet box cover comprising a cover plate, insulating bushings fitted to the cover plate, and a metallic cap plate secured upon the cover plate and having a holding engagement with said bushings.

2. An outlet box cover comprising a cover plate, insulating bushings fitted to the cover plate, and a cap plate secured upon the cover plate and having flanges engaging the bushings.

3. An outlet box cover comprising a cover plate, insulating bushings fitted to the cover plate, and a cap plate secured upon the cover plate and having individual holding flanges for each bushing.

4. An outlet box cover comprising a cover plate, wire holding bushings fitted to the cover plate, and a cap plate secured upon the cover plate and having individual holding means for each bushing.

5. An outlet box cover comprising a cover plate, insulating bushings fitted to the cover plate, and a cap plate secured upon the cover plate and having individual annular holding flanges for each bushing.

6. An outlet box cover comprising a cover plate, insulating bushings fitted to the cover plate and having tapered head portions, and a cap plate secured upon the cover plate and having tapering annular holding flanges embracing the bushings.

7. An outlet box cover comprising a cover plate, insulating bushings fitted to the cover plate and having tapered head portions, and a cap plate having a marginal securing flange engaging the edge of the cover plate, and also provided with tapering annular holding flanges for the bushings.

In testimony whereof I hereunto affix my signature in the presence of two witnesses.

EDGAR H. FREEMAN.

Witnesses:
BESSIE BATH,
C. J. FABER.